Aug. 7, 1962    J. D. McKEAN    3,048,147
PORTABLE COLLAPSIBLE SHIPPING KENNEL FOR ANIMALS
Filed Sept. 8, 1959
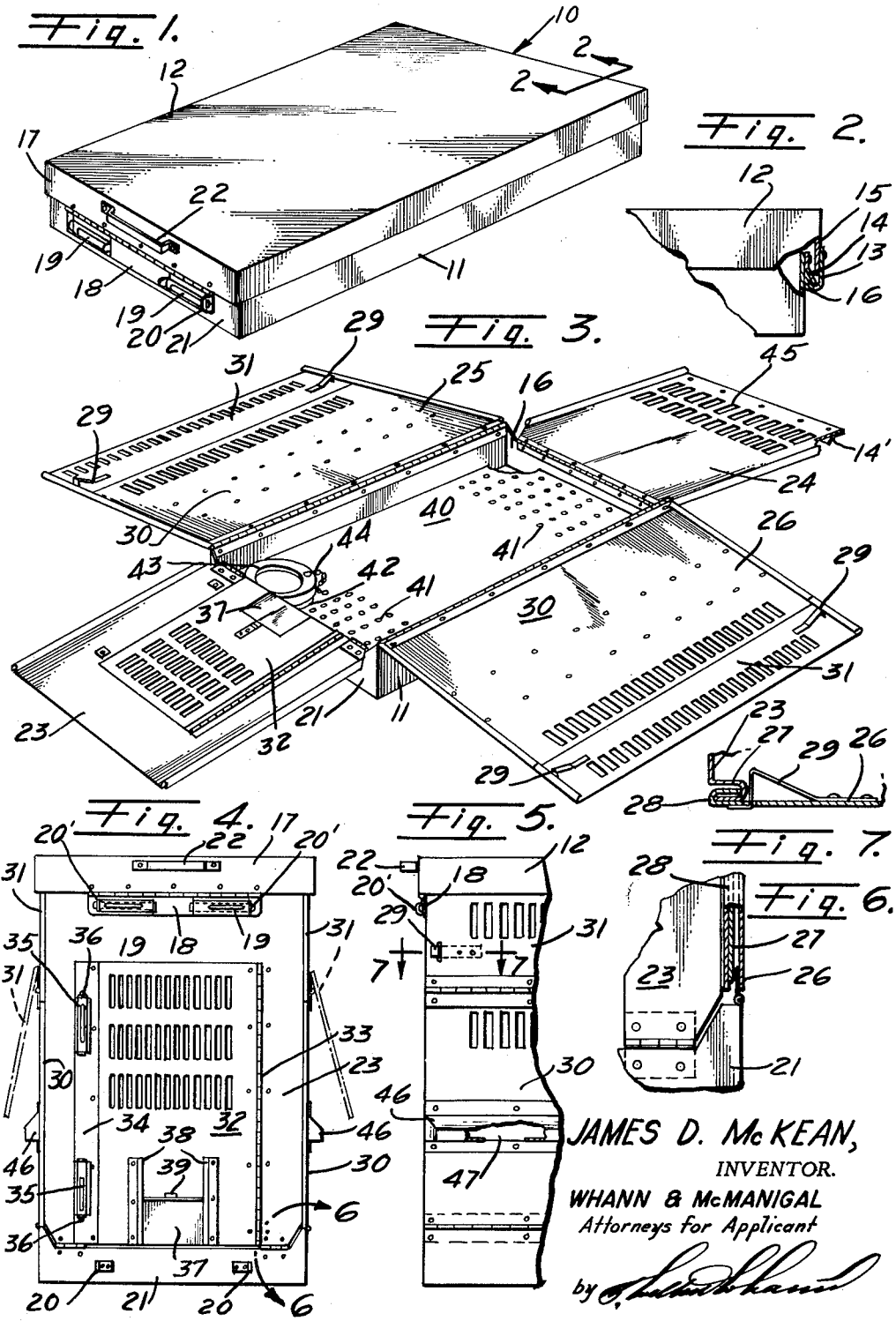
JAMES D. McKEAN,
INVENTOR.
WHANN & McMANIGAL
Attorneys for Applicant

United States Patent Office 3,048,147
Patented Aug. 7, 1962

3,048,147
PORTABLE COLLAPSIBLE SHIPPING KENNEL
FOR ANIMALS
James D. McKean, Los Angeles, Calif., assignor to Premere Manufacturing Corp., Los Angeles, Calif., a corporation of California
Filed Sept. 8, 1959, Ser. No. 838,643
6 Claims. (Cl. 119—19)

The present invention relates generally to portable collapsible containers which are foldable into a compact unit when not in use or for storage, and which may be readily extended for use.

The container of the present invention is susceptible of general use for transporting objects and materials, and is especially adapted for use in aircraft having limited space requirements, where the container features may be embodied into a collapsible kennel which is particularly adapted for the transportation of small animals, such as cats, dogs and the like.

Heretofore conventional structures have attempted to provide containers which may be utilized for the above indicated purpose, but in the main these containers have been inherently objectionable in that they were of crude construction, and did not in the case of kennels provide for the comfort of the animal nor seek to safeguard the health of the animal and protect it against injury during transportation.

Having the foregoing in mind, it is one object of the present invention to provide a collapsible container construction, wherein top and bottom sections form an enclosing case for carrying the collapsed container, and in which side walls are sectionalized so as to make it possible to obtain a container having greater height than the width of the bottom section into which the side walls are folded.

A further object is to provide a container for the foregoing purpose, which may be collapsed into an opened flat condition to facilitate hosing and steam cleaning.

A still further object is to provide a portable kennel which is so arranged and constructed that the possibility of physical injury to the animal is reduced to a minimum, and in which the health of the animal will not be jeopardized by undesirable drafts, or unsanitary conditions.

Another object is to provide a kennel construction having bumper rails which will maintain adjacent containers or kennels in sufficiently spaced apart relation so as to maintain proper ventilation around the kennels.

Still another object is to provide a kennel having a combined relatively large hinged door for use in placing the animal into the kennel, this door containing a slide panel for feeding instead of a panel of the swinging type which presents a source of possible damage or injury to the animal, and in which the animal might possibly catch its head or other body part.

Briefly, the container of the present invention comprises a bottom section having upwardly projecting peripheral flanges which are hinged to adjacent side sections to form the side and end walls of the container. A cover section is constructed with downwardly projecting peripheral flanges which are adapted to extend over the upper margins of the extended side and end panels. An inwardly projecting flange along one end of the cover member interlocks with an outwardly projecting flange on an adjacent end panel to releasably secure the end of the cover to the end panel, while means at the upper margin of the opposite end panel and the adjacent end of the cover section releasably secures the other end of the cover section to the end panel to complete the enclosure of the assembled container for use. A flange projecting outwardly from the end flange to the bottom section is provided for interlocking with the inwardly projecting flange on the cover section, and means on the opposite end of the bottom section are provided for releasably securing the adjacent end of the cover member to the bottom section so as to retain the side panels folded over one another into the bottom section for compact storage and portability.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a perspective view of the herein described invention showing the container in collapsed folded condition for storage or portability;

FIG. 2 is a fragmentary sectional view, taken substantially on line 2—2 of FIG. 1, showing releasable interlocking means at one end of the cover section;

FIG. 3 is a perspective view showing the side and end panels in opened extended relation, the cover member being removed;

FIG. 4 is a front end elevational view of a kennel embodying the present invention, the parts being in extended assembled position of use;

FIG. 5 is a fragmentary side elevational view of a corner portion of the same;

FIG. 6 is a fragmentary partial view, partly in section, taken substantially on line 6—6 of FIG. 4; and FIG. 7 is a detail corner section showing the interlocking means between a side panel and end panel, taken substantially on line 7—7 of FIG. 5.

Referring now more specifically to the drawings, for illustrative purposes, the collapsible container of the present invention, as generally indicated by the numeral 10, is shown in FIG. 1 as comprising a bottom section 11 and a top section 12 which are releasably secured together to form a casing for the transport or storage of the collapsed container of the present invention.

The cover section and bottom section are each constructed with end flanges and side flanges which are arranged to overlap, when used to form the carrying case of the collapsed container. The cover and bottom sections are releasably secured at their ends, as shown in FIG. 2 by means for interlocking flanges 13 and 14, the flange 13 being secured by suitable conventional means to an end flange 15 of the cover section, and the flange 14 being secured to an end flange 16 of the bottom section. At the forward end, the cover section has an end flange 17 upon which there is hingedly secured an elongate hasp 18 which carries at its ends spring actuated bayonet fasteners 19—19, which are adapted to respectively engage staple means 20—20 mounted on end flange 21 of the bottom section 11. The end flange 17 of the cover section is also provided with a carrying handle 22 by which the collapsed container including the cover and bottom sections may be easily transported.

Referring now to FIG. 3, the bottom section is shown as having its upturned side and end flanges as being hingedly connected at their outer extremities with a front end panel 23, a back end panel 24, and side panels 25 and 26 respectively. The end and side panels are arranged to be interlocked along their adjacent edges and held in upstanding extended position, when the container is opened for use. More specifically, the end panels 23 and 24 are provided with an interlocking flange 27 along each of its side edges, as shown in FIG. 7, while the side panels are provided along each end edge with an interlocking flange 28. Spring latching members 29 are carried by the side panels for retaining the interlocked panels in extended position. Upon depressing the spring latching members 29, the end and side panels may be disengaged for folding to a spread out condition as shown in FIG. 3 for cleaning as by hosing or steam cleaning, or the end and side panels may be folded into the bottom section for transport or storage.

Conventionally, the bottom and cover sections are of rectangular configuration, being of more narrow width than length, the width usually being such as to conform with aircraft regulations. Thus a problem is presented, when it is desired to provide a container having greater height than the width of the bottom and cover sections, since it is necessary to fold the side panels into the bottom section. This problem is overcome by providing side panels which are composed of, for example, hinged sections 30 and 31, in each case so as to permit the section 31 being folded alongside the adjacent section 30, as shown in FIG. 4.

When the invention is incorporated into a container which is to be used as a kennel, the forward end panel 23 is provided with a relatively large swingable door 32 which is shown in FIG. 4 as being hinged along an edge 33, the opposite edge of the door being provided with an elongate hasp 34 which carries at its ends bayonet fasteners 35—35 which are engageable with staple means 36 in each case mounted on the end panel. The hinge door provides a closeable access for placing an animal in the kennel, or removing it. However, other access is desirable for feeding purposes without the necessity of having to open the main door. This is accomplished by providing a slide panel 37 supported for raising and lowering movement in guide members 38—38 at its end edges. The side panel 37 is retained in its closed position by spring latch 39, this latch being arranged upon being depressed to permit movement of the slide panel 37 to open position. A slide panel has been utilized for this purpose, since swingable or hinged feeding doors have been known to constitute a possible injury to the animal due to catching its head or other body parts in the door.

As shown in FIG. 3 the bottom section is provided with an auxiliary bottom panel 40 having turned down peripheral flanges which support the panel in spaced relation above the bottom of the bottom section to provide space in which absorbing material such as cedar shavings, and the like may be placed. It will be observed that such materials are thus maintained out of contact with the animal. The panel 40 is provided with perforate portions adjacent its ends in the form of small openings 41 which permit ventilation, but are sufficiently small to prevent passage of any part of the animal's body therethrough. In some instances, expanded metal lath has been used, but these have proved unsatisfactory and inhumane, since it is possible for the animal's paw or foot to become engaged between the meshes or in the openings of the material.

Additionally, near the front end panel 23, in close proximity to the slide panel 37, there is provided an opening in the panel 40 at the periphery of which there is affixed an upstanding circular flange 42 within which there may be positioned a water or food receptacle. The receptacle is retained in position by means of a removable flanged retaining ring 43 which may be anchored by a flexible chain or other means 44 to the panel 40.

It will be observed that the side panels and end panels of the container are respectively provided with a series of parallel slot openings 45 for ventilation purposes. However, it will be noted that these openings are in the uppermost portions of the side and end panels, thus enabling the animal to assume a position in the container or kennel where it will not be subjected directly to drafts which might be injurious. Moreover, in order to prevent the possibility of the kennels being so closely packed in aircraft or other locations of limited space, bumper side rails 46 are provided on the side panels 25 and 26. These side rails have cut-out under portions as indicated at 47 to form hand-holes to facilitate carrying of the kennel during movement thereof when it is extended into a condition of use.

As shown in FIGS. 4 and 5, the cover section fits over the upper margins of the extended end panels and side panels, when the container is assembled for use. As thus arranged, the top section cooperates to reenforce and maintain the end and side panels in proper position, and as so used the cover is interlocked at its back end with an interlocking flange 14' at the upper end margin of the end panel 24 in the same manner as previously described, while the hasp 18 at the forward end of the cover section is cooperatively associated with staple means 20' at the uppermost margin of the forward end panel 23.

It is believed that it will be readily apparent from the foregoing description that the collapsible container and kennel structure previously described accomplishes the objects as set forth at the beginning of the description.

Various modifications may suggest themselves to those skilled in the art without departing from the spirit of my invention, and, hence, I do not wish to be restricted to the specific form shown or uses mentioned, except to the extent indicated in the appended claims.

I claim:

1. A portable collapsible shipping kennel, comprising: a bottom section having upturned side and end flanges; side panels and end panels of greater height than the width of said bottom section respectively having hinged connection with the outer extremities of said flanges for selective movement into collapsed folded relation into the bottom section, and into upstanding extended relation, each of said side panels having interconnected upper and lower sections foldable to a vertical height dimension in a direction extending from its hinge connection which is less than the horizontal dimension of the bottom in a direction extending from said hinge connection; means for releasably connecting the adjacent edges of the end panels and unfolded side panels so as to retain them in extended upstanding relation; a cover section having downturned side and end flanges arranged to extend over the side and end flanges of the bottom section, said cover and bottom sections cooperating to form a closure for the folded side and end panels therein, and said cover being positionable over the upper edge extremities of said side and end panels in their upstanding extended relation to form a container; means for releasably connecting said cover section and bottom section with said panels in folded position, and for connecting said cover section and at least two of said panels in their extended position; and a removable auxiliary bottom panel contained in said bottom section, said panel being raised above the bottom to provide space for absorbing material thereunder, and having an imperforate central portion and ventilating openings in its ends portion.

2. A portable collapsible shipping kennel, comprising: a bottom section having upturned side and end flanges; side panels and end panels of greater height than the width of said bottom section respectively having hinged connection with the outer extremities of said flanges for selective movement into collapsed folded relation into the bottom section, and into upstanding extending relation, each of said side panels having interconnected upper and lower sections foldable to a vertical height dimension in a direction extending from its hinge connection which is less than the horizontal dimension of the bottom in a direction extending from said hinge connection; means for releasably connecting the adjacent edges of the end panels and unfolded side panels so as to retain them in extended upstanding relation; a cover section having downturned side and end flanges arranged to extend over the side and end flanges of the bottom section, said cover and bottom sections cooperating to form a closure for the folded side and end panels therein, and said cover being positionable over the upper edge extremities of said side and end panels in their upstanding extended relation to form a container; means for releasably connecting said cover section and bottom section with said panels in folded position, and for connecting said cover section and at least two of said panels in their extended position; and a removable raised perforate auxiliary bottom panel contained in said bottom section, said bottom panel having an opening therein providing access to a feeding receptacle extending below said auxiliary bottom panel.

3. A portable collapsible shipping kennel, comprising: a bottom section having upturned side and end flanges; side panels and end panels of greater height than the width of said bottom section respectively having hinged connection with the outer extremities of said flanges for selective movement into collapsed folded relation into the bottom section, and into upstanding extended relation, each of said side panels having interconnected upper and lower sections foldable to a vertical height dimension in a direction extending from its hinge connection which is less than the horizontal dimension of the bottom in a direction extending from said hinge connection; means for releasably connecting the adjacent edges of the end panels and unfolded side panels so as to retain them in extended upstanding relation; a cover section having downturned side and end flanges arranged to extend over the side and end flanges of the bottom section, said cover and bottom sections cooperating to form a closure for the folded side and end panels therein, and said cover being positionable over the upper edge extremities of said side and end panels in their upstanding extended relation to form a container; means for releasably connecting said cover section with said bottom section and said upstanding panels; a removable raised perforate auxiliary bottom panel contained in said bottom section, having an opening therein; and means for anchoring a feeding receptacle in said opening extending below said auxiliary bottom panel.

4. A portable collapsible shipping kennel for animals, comprising: a bottom section; side panels and end panels having hinged connection with side and end portions respectively of the bottom section for selective movement into collapsed folded relation overlying the bottom section, said side panels each having a series of ventilating openings extending longitudinally thereof and a hinged upper section enabling folding of the side panel to a size having a vertical height dimension in a direction extending from said bottom hinge connection approximately equal but slightly less than the horizontal dimension of the bottom in a direction extending from said bottom hinge connection so as to be capable of being positioned in the bottom section, and into upstanding extended relation to a height adapted to accommodate a relatively high animal; means for releasably connecting the adjacent edges of the end panels and side panels so as to retain them in extended upstanding relation; a cover section coextensive with the bottom section, said cover section and bottom section cooperating to form a closure for the folded side and end panels therein, and said cover section being positionable over the upper edge extremities of said side and end panels in their upstanding extended relation to form a top for the kennel; means for releasably connecting said cover section and bottom section, when said panels are in a folded position; and means connecting said cover section and at least two of said panels, when the panels are in their extended position.

5. A portable collapsible shipping kennel for animals, comprising: a bottom section; side panels and end panels of greater height than the width of said bottom section respectively having hinged connection with side and end portions respectively of the bottom section for selective movement into collapsed folded relation overlapping the bottom section, said side panels each having a series of ventilating openings extending longitudinally thereof and a hinged upper section enabling folding of the side panel to a size having a vertical height dimension in a direction extending from said bottom hinge connection approximately equal but slightly less than the horizontal dimension of the bottom in a direction extending from said bottom hinge connection so as to be capable of being positioned in the bottom section, and into upstanding extended relation to a height adapted to accommodate a relatively high animal; means for releasably connecting the adjacent edges of the end panels and the side panels so as to retain them in extended upstanding relation; a cover section coextensive with the bottom section, said cover section and bottom section cooperating to form a closure for the folded side and end panels therein, and said cover section being positionable over the upper edge extremities of said side and end panels in their upstanding extended relation to form a top for the kennel; means for releasably connecting said cover section and bottom section, when said panels are in a folded position; means connecting said cover section and at least two of said panels, when the panels are in their extended position; and an outer bumper rail carried by and extending longitudinally of each of the side panels, operative during use of the kennel to prevent closure of said ventilating openings by adjacently positioned wall surfaces.

6. A portable collapsible shipping kennel for animals, comprising: a bottom section; side panels and end panels having hinged connection with side and end portions respectively of the bottom section for selective movement into collapsed folded relation overlying the bottom section, and into upstanding extending relation, said side panels each having a series of ventilating openings extending longitudinally thereof and a vertical heighth dimension in a direction extending from said bottom hinge connection approximately equal but slightly less than the horizontal dimension of the bottom in a direction extending from said bottom hinge connection; means for releasably connecting the adjacent edges of the end panels and the side panels so as to retain them in extended upstanding relation; a cover section coextensive with the bottom section, said cover section and bottom section cooperating to form a closure for the folded side and end panels therein, and said cover section being positionable over the upper edge extremities of said side and end panels in their upstanding extended relation to form a top for the kennel; means for releasably connecting said cover section and bottom section, when said panels are in a folded position; means connecting said cover section and at least two of said panels, when the panels are in their extended position; and an outer bumper rail carried by and extending longitudinally of each of said side panels, operative during use of the kennel to prevent closure of said ventilating openings by adjacently positioned wall surfaces.

References Cited in the file of this patent

UNITED STATES PATENTS

| | | |
|---|---|---|
| 315,925 | Evans | Apr. 14, 1885 |
| 621,044 | Deerwester | Mar. 14, 1899 |
| 1,121,425 | Wakeman | Dec. 15, 1914 |
| 1,194,570 | Stuart | Aug. 15, 1916 |
| 1,286,822 | Straley | Dec. 3, 1918 |
| 2,134,051 | Kirby | Oct. 25, 1938 |
| 2,529,893 | Albert | Nov. 14, 1950 |
| 2,534,492 | Williams | Dec. 19, 1950 |
| 2,538,778 | Halpin | Jan. 23, 1951 |
| 2,678,628 | Williams | May 18, 1954 |
| 2,685,964 | Brown | Aug. 10, 1954 |
| 2,792,144 | Mayer | May 14, 1957 |
| 2,844,272 | Mayer et al. | July 22, 1958 |